United States Patent Office 3,317,533
Patented May 2, 1967

3,317,533
THEOPHYLLINE DERIVATIVES
René Rachel De Ridder, Brussels, Belgium, assignor to Manufacture de Produits Pharmaceutiques A. Christiaens Societe Anonyme, Brussels, Belgium
No Drawing. Continuation of application Ser. No. 229,485, Oct. 9, 1962. This application Apr. 13, 1966, Ser. No. 543,492
Claims priority, application Great Britain, Apr. 22, 1960, 14,252/60
2 Claims. (Cl. 260—253)

This application is a continuation of copending application Ser. No. 229,485, filed Oct. 9, 1962 (now abandoned), which in turn is a continuation-in-part of application Ser. Nos. 103,200 and 103,201, both filed on Apr. 17, 1961 (and both now abandoned).

The present invention relates to two new classes of dialkyl xanthine derivatives and to processes for the preparation thereof. More particularly, the invention is concerned with new derivatives of 8-benzyl dialkyl xanthines, and also with a process for the preparation thereof.

The first class of dialkyl xanthine compounds, which are valuable intermediates for use in the preparation of the therapeutically active dialkyl xanthine derivatives of the second class, comprises 8-benzyl-xanthine derivatives substituted in the 7-position by a halogenoalkyl radical with a straight or branched chain of the formula:

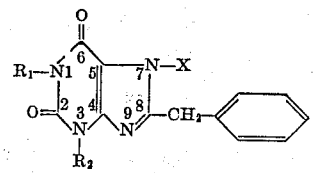

(I)

in which $R_1$ and $R_2$, which may be the same or different, represent lower alkyl radicals, for example methyl radicals, and X represents a straight-chain or branched-chain halogenoalkyl radical, having a maximum of 4 carbon atoms.

The following are examples of intermediate compounds according to the invention:

(1) 7-($\beta$-chloroethyl)-8-benzyltheophylline

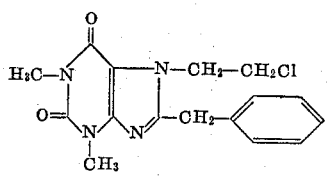

(II)

(2) 7-($\beta$-bromoethyl)-8-benzyltheophylline

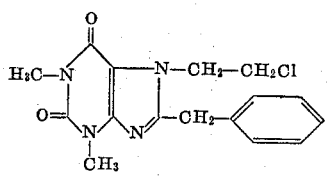

(III)

(3) 7-($\gamma$-bromopropyl)-8-benzyltheophylline

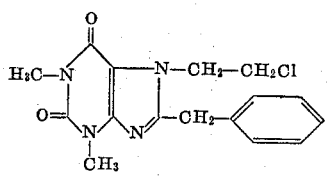

(IV)

(4) 7-($\gamma$-chloropropyl)-8-benzyltheophylline

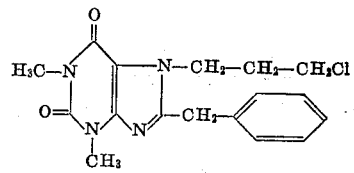

(V)

(5) 7-($\delta$-chlorobutyl)-8-benzyltheophylline

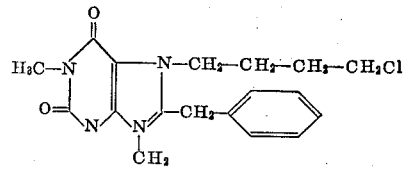

(VI)

(6) 7-($\delta$-bromobutyl)-8-benzyltheophylline

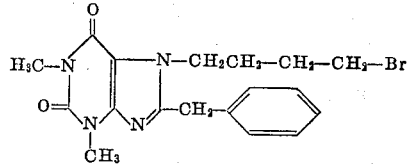

(VII)

(7) 7-($\beta$-methyl-$\delta$-chloropropyl)-8-benzyltheophylline

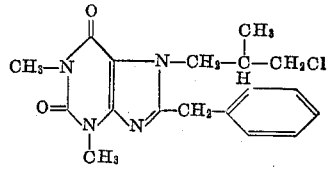

(VIII)

For the preparation of compounds of Formula I, a dihalide of an alkane comprising at the most 4 carbon atoms is reacted with an alkali metal, for example potassium or sodium or an ammonium salt of an 8-benzyl-dialkyl xanthine in the presence of an aqueous alcoholic solvent, under reflux or in a closed receptacle at fairly elevated temperature. A mixture of water and ethanol or a mixture of water and isopropanol can for example be used as the aqueous alcoholic solvent.

It is advantageous to use an excess of the alkane dihalide in relation to the stoichiometrically necessary quantity.

According to the invention, the new 7-haloalkyl-8-benzyltheophyllines may be prepared by a two-step process which may be represented as follows:

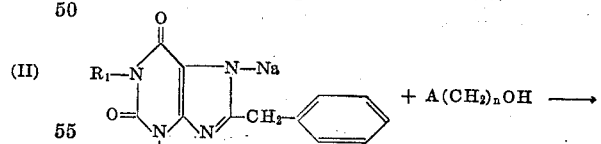

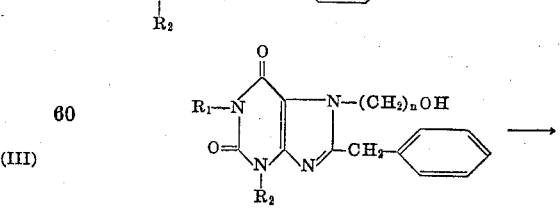

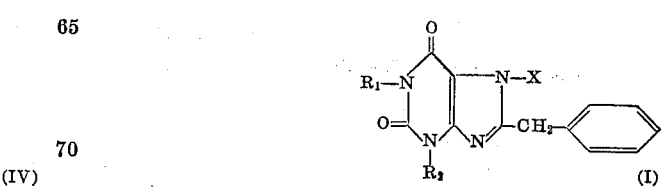

In the formulae, X represents a lower halogenalkyl radical.

In this process, the sodium salt of 8-benzyltheophylline is reacted with a lower haloalkanol. The obtained 7-hydroxy lower alkyl-8-benzyltheophylline is then reacted, for example with thionyl chloride or phosphor tribromide so as to obtain a 7-haloalkyl-8-benzyltheophylline.

The second class of therapeutically active dialkyl xanthine derivatives comprises derivatives of 8-benzyl dialkyl xanthines substituted in the 7-position and of the general formula:

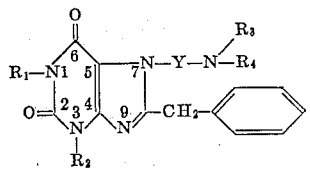

(IX)

in which $R_1$ and $R_2$, which may be the same or different represent lower alkyl radicals, $R_3$ represents hydrogen or a lower alkyl, monocyclic, aryl, lower hydroxyalkyl or lower hydroxyalkyl aryl radical which may be substituted in the nucleus, $R_4$ represents a lower hydroxyalkyl radical and Y represents a lower alkylene group.

The invention also provides the acid addition salts of the compounds according to Formula IX, such as the hydrochlorides.

The following are examples of compounds of the general Formula IX according to the invention:

(1) 7-(N-β-hydroxyethylamino-ethyl)-8-benzyltheophylline

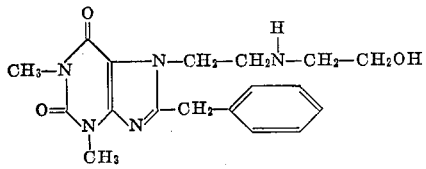

(X)

(2) 7-(N-methyl-N-β-hydroxyethylamino - ethyl)-8-benzyltheophylline

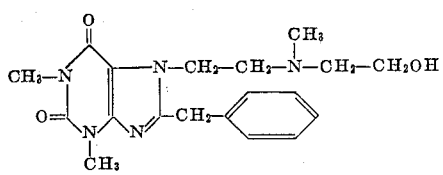

(XI)

(3) 7-(N-ethyl-N-β-hydroxyethylamino-ethyl)-8-benzyltheophylline

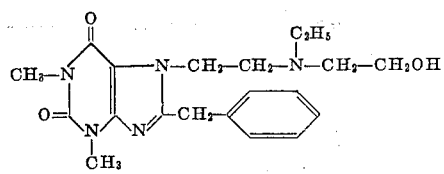

(XII)

(4) 7-(N-bis-β-hydroxyethylamino-ethyl)-8-benzyltheophylline

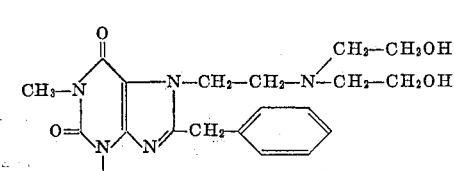

(XIII)

(5) 7-(N-β-hydroxypropylamino-ethyl)-8-benzyltheophylline

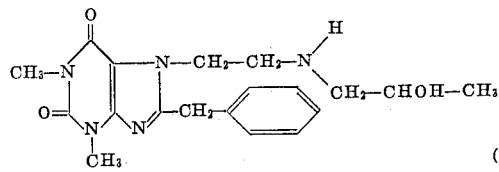

(XIV)

(6) 7-(N-α-dimethyl-β-hydroxyethylamino-ethyl)-8-benzyltheophylline

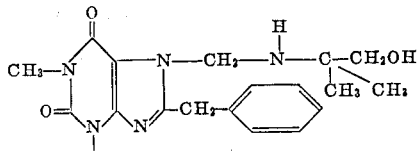

(XV)

(7) 7-(N-methyl-N-α-methyl-β-phenyl-β-hydroxyethyl-aminoethyl)-8-benzyltheophylline

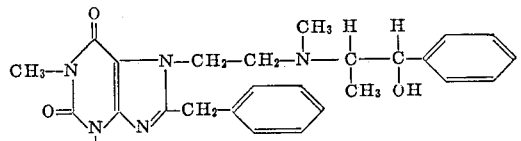

(XVI)

(8) 7-(N-ethyl-N-β'-hydroxyethyl-γ-aminopropyl)-8-benzyltheophylline

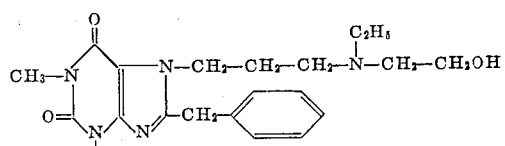

(XVII)

(9) 7-(N-ethyl-N-β'-hydroxyethyl-δ-aminobutyl)-8-benzyltheophylline

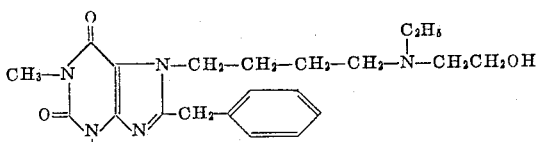

(XVIII)

(10) 7-(N-ethyl-N-β'-hydroxyethyl-β-methyl-γ-aminopropyl)-8-benzyltheophylline

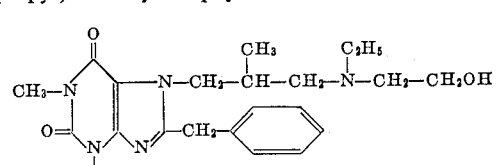

(XIX)

The compounds of the second class of compounds according to the invention have valuable pharmacological properties and can thus be used as medicines. They can also be employed as intermediate compounds in the synthesis of other pharmacologically active compounds.

Pharmacological tests have shown that the compounds of the general Formula IX, particularly the 7-(N-ethyl-N-β-hydroxyethylamino-ethyl)-8-benzyltheophylline, have valuable activities:

(1) Positive action on the respiratory rhythem and amplitude.
(2) Dilatory effect on the vascular system and the bronchial apparatus.
(3) Stimulating action on the myocardial contraction and on the coronary irrigation.
(4) Spasmolytic action on the digestive tract and on the gallbladder.

(5) Increase of the pulmonary ventilation.
(6) Diuresis.

In contrast with theophylline and known theophylline derivatives, said active compounds do not stimulate the central nervous system and have, on the contrary, a surprising and beneficial sedative effect.

Moreover, the analeptic power of the compounds according to this invention is higher than that of theophylline and known derivatives thereof, whereas the spasmolytic action on the digestive tract and on the gallbladder of the compounds according to the invention is also higher than with theophylline and known derivatives of theophylline.

Under these circumstances, the new compounds of the general Formula IX may be used for the control of diseases, such as collapse of the circulatory system, angina pectoris, infarctus of the myocardium, respiratory depression, asthma, various diseases of the lungs, spasms of the biliary system, of the urinary system and of the brain vessels.

The new compounds of the Formula IX according to the invention may be formulated for administration in conventional manner with the aid of suitable pharmaceutical carriers or excipients. Preparations for oral, parenteral or rectal administration are of particular convenience. Suitable preparations are those in solid form, particularly in the form of dosage units, each dosage unit containing a sufficient amount of the active ingredient to provide a single dose. The content of active ingredient on each dosage unit may be from 250 to 600 mg., preferably 300 to 500 mg. Suitable dosage unit presentations include tablets, capsules, pills, dragées, suppositories, rectal capsules, etc. Dragées may, for example, contain 200 to 400 mg. of active ingredient. The new compounds of the general Formula IX may also be formulated in liquid form for intramuscular or intravenous injection, with the usual carriers, such as physiological serum or distilled water. The vials may contain unit doses of 200 to 400 mg. of active ingredient.

Solid preparations for oral administration may be formulated as desired. Thus, in the preparation of tablets, pills or dragées, one may include diluents, such as saccharose, lactose, glycine, sorbitol, etc.; binding agents such as polyethylene glycol, polyvinylpyrrolidone, gelatine, etc. and lubricants such as magnesium stearate, starch, talc, liquid paraffin, sodium benzoate, titanium oxide, etc. Suppositories may comprise the active ingredient dispersed in a usual suppository base.

For the preparation of compounds of Formula IX, a 7-halogenoalkylbenzyltheophylline can be reacted with a suitable primary or secondary amine containing at least one hydroxy group. It is preferred to operate in an organic solvent, such as a lower aliphatic alcohol, benzene, xylene, toluene or a ketone, such as acetone or methyl ethyl ketone. It is however also possible to dispense with the use of a solvent and to carry out the reaction in the molten mass of the reagents.

The reaction temperature can vary; it is normally between 80 to 160° C.

The primary and secondary amines are preferably employed in a proportion of at least 2 mols of amine to 1 mol of 7-halogeno-alkyl-8-benzyltheophylline or in a proportion of 1 mol of amine to 1 mol of 7-halogeno-alkyl-8-benzyltheophylline, in the presence of an excess of anhydrous sodium or potassium carbonate.

The halohydrates obtained can be converted into free bases in known manner.

The invention is further illustrated by the following examples:

EXAMPLE 1.

*Preparation of 7-(β-chloroethyl)-8-benzyltheophylline (Formula II)*

A mixture of 16.2 g. of 8-benzyltheophylline, 2.4 g. of sodium hydroxide, 150 cc. of water, 150 cc. of isopropanol and 30 cc. of 1,2-dichloroethane is heated for 72 hours under reflux and while stirring. All the solvents are then driven off in vacuo, the aqueous solution is made alkaline and the precipitate which is obtained is filtered.

17 g. of 7-(β-chloroethyl)-8-benzyltheophylline are obtained, melting point 114 to 114.5° C., after recrystallisation from methanol, or at 124° C.

The filtrate is then acidified and in this way about 15% of unreacted 8-benzyltheophylline are obtained.

EXAMPLE 2

*Preparation of 7-(β-bromoethyl)-8-benzyltheophylline (Formula III)*

A mixture of 40.5 g. of 8-benzyltheophylline, 40 g. of sodium hydroxide, 400 cc. of water, 400 cc. of isopropanol and 100 cc. of 1,2-dibromoethane is heated under reflux and while stirring for 72 hours. All the solvents are then driven off in vacuo, the aqueous solution is made alkaline and the resulting precipitate is filtered.

50 g. of 7-(β-bromoethyl)-8-benzyltheophylline are obtained, melting point 135 to 137° C. after recrystallisation from acetone.

EXAMPLE 3

*Preparation of 7-(β-chloroethyl)-8-benzyltheophylline (Formula II)*

The dry sodium salt of 8-benzyltheophylline is first prepared from 8.5 g. of 8-benzyltheophylline and 15.6 cc. of 2 N NaOH, the mixture being evaporated under reduced pressure.

The sodium salt is then mixed with 6.5 cc. of β-chloroethanol in 200 cc. of absolute ethanol and the mixture is heated under reflux and while stirring for 18 hours. The solvent is then driven off and the residue is extracted with boiling benzene. After filtration and concentration, 5.2 g. of 7-(β-hydroxyethyl)-8-benzyltheophylline (M.P. 149–150° C.) are obtained.

3.20 of 7-(β-hydroxyethyl)-8-benzyltheophylline, 215 g./cc. of thionyl chloride and 35 cc. of anhydrous benzene are refluxed. When the reaction is finished, the benzene is driven off and the residue is recrystallized from ethanol.

The obtained 7-(β-chloroethyl)-8-benzyltheophylline melts at 114° C.

EXAMPLE 4

*Preparation of 7-(γ-bromopropyl)-8-benzyltheophylline (Formula IV)*

A mixture of 2.7 g. of 8-benzyltheophylline, 5 cc. of isopropanol, 5 cc. of 2 N NaOH and 16, 16 g. of 1,3-dibromopropane is heated under reflux during 4 hours.

After evaporation of the solvents in vacuo, the residue is extracted with chloroform. The chloroform solution is extracted with soda, in order to remove the unaltered starting compound, then washed with water, dried and evapored in vacuo.

The residue is extracted with boiling ethanol and the obtained slurry is filtered for removing a secondary product (dimer; M.P. 240–241° C.) The alcohol solution is evaporated to dryness and the residue is recrystallized in cyclohexane containing a small amount of benzene. The 7-(γ-bromopropyl)-8-benzyltheophylline is obtained with a yield of 65%. M.P. 106–107° C.

EXAMPLE 5

*Preparation of 7-(γ-chloropropyl)-8-benzyltheophylline (Formula V)*

A mixture of 5.4 g. of 8-benzyltheophylline, 10 cc. of 2 N NaOH, 20 cc. of isopropanol and 18 g. of 1,3-dichloropropane is refluxed during 22 hours. The reaction mixture is then treated as described in Example 4.

After recrystallization from ethanol, the desired compound melts at 125–126° C. Yield: 60%.

EXAMPLE 6

*Preparation of 7-(γ-chloropropyl)-8-benzyltheophylline (Formula V)*

A mixture of 216 g. of 8-benzyltheophylline, 400 cc. of 2 N NaOH, 800 cc. of isopropanol and 750 g. of 1-bromo-3-chloropropane is refluxed during 3 hours.

The reaction is then treated as described in Example 4. One obtains 210 g. of 7-(γ-chloropropyl)-8-benzyltheophylline melting at 124–125° C.

EXAMPLE 7

*Preparation of 7-(δ-chlorobutyl)-8-benzyltheophylline (Formula VI)*

A mixture of 5.4 g. of 8-benzyltheophylline, 10 cc. of 2 N NaOH, 20 cc. of isopropanol and 20.3 g. of 1,4-chlorobutane is refluxed during 2 hours.

The desired product is obtained by treating the reaction mixture as described in Example 4. M.P. 117–118° C. (from ethanol).

EXAMPLE 8

*Preparation of 7-(δ-bromobutyl)-8-benzyltheophylline (Formula VII)*

A mixture of 2.7 g. of 8-benzyltheophylline, 5 cc. of 2 N NaOH, 5 cc. of isopropanol and 17.3 g. of 1,4-dibromobutane is refluxed during 15 hours until the pH is acid. The reaction mixture is treated as described in Example 4. After recrystallization from cyclohexane, 7-(δ-bromobutyl)-8-benzyltheophylline melting at 125–126° C. is obtained with a substantially quantitative yield.

EXAMPLE 9

*Preparation of 7-(β-methyl-γ-chloropropyl)-8-benzyltheophylline (Formula VIII)*

A mixture of 5.4 g. of 8-benzyltheophylline, 10 cc. of 2 N NaOH, 20 cc. of isopropanol and 27.5 g. of β-methyl-σ-(γ-chlorobromopropane is heated under reflux during 19 hours. After treatment as described in Example 4, one obtains 40% unchanged 8-benzyltheophylline and about 50% of 7-(β-methyl-γ-chloropropyl)-8-benzyltheophylline melting at 131–132° C., after recrystallization from methanol.

EXAMPLE 10

*Preparation of 7-(N-β-hydroxyethylaminoethyl)-8-benzyltheophylline hydrochloride (Formula X)*

A mixture of 3.75 g. of 7-(β-bromoethyl)-8-benzyltheophylline, 1.2 cc. of ethanolamine and 1.25 cc. of absolute ethanol is kept boiling under reflux for 24 hours while stirring. Dilute hydrochloric acid and chloroform are then added and the aqueous layer is separated from the organic phase. This aqueous solution is made alkaline and separated from the chloroform. The chloroformic solution is dried, filtered and evaporated to dryness. An oily residue is obtained which crystallises on addition of petroleum ether, producing white micro-crystals. The hydrochloride of this base, which is prepared under normal conditions, melts at 219 to 220° C. (ethanol) and contains 1 molecule of water.

EXAMPLE 11

*Preparation of 7-(N-β-hydroxyethylaminoethyl)-8-benzyltheophylline hydrochloride (Formula X)*

A mixture of
3.75 g. of 7-(β-bromoethyl)-8-benzyltheophylline,
1.8 cc. of ethanolamine and
20 cc. of xylene
is refluxed during 43 hours.

The mixture is treated as described in Example 10. One obtains, with a yield of 90%, the hydrochloride of the compound of Formula XI melting at 219–220° C., after recrystallization in ethanol.

EXAMPLE 12

*Preparation of 7 - (N - methyl-N-β-hydroxyethylaminoethyl) - 8 - benzyltheophylline hydrochloride (Formula XII)*

A mixture of 2.75 g. of 7-(β-bromoethyl)-8-benzyltheophylline, 1.5 g. of N-methyl-ethanolamine and 10 cc. of methylethyl ketone is kept at boiling point for 24 hours while stirring.

By then following the procedure set forth in Example 10, 3 g. of 7-(N-methyl-N-β-hydroxyethylaminoethyl)-8-benzyl theophylline hydrochloride are obtained, containing 1 molecule of water and melting at 195.5 to 197° C. (ethanol).

EXAMPLE 13

*Preparation of 7-(N-ethyl-N-β-hydroxyethylaminoethyl)-8-benzyltheophylline hydrochloride (Formula XIII)*

A mixture of 127.5 g. of 7-(β-chloroethyl)-8-benzyltheophylline, 68.5 g. of N-ethyl-ethanolamine and 125 cc. of xylene is kept boiling under reflux for 24 hours.

The procedure set forth in Example 10 is then followed and white micro-crystals are obtained which melt at 80 to 80.5° C.

The yield of 7-(N-ethyl-N-hydroxyethylaminoethyl)-8-benzyltheophylline hydrochloride, which melts at 185 to 186° C. and which is very soluble in water, is 108 g.

EXAMPLE 14

*Preparation of 7-(N-ethyl-N-β-hydroxyethylaminoethyl)-8-benzyltheophylline hydrochloride (Formula XIII)*

A mixture of 3.75 g. of 7-(β-bromoethyl)-8-benzyl theophylline, 2 cc. of N-ethyl-ethanolamine and 5 cc. of xylene is kept at boiling point under reflux for 24 hours.

By then proceeding in accordance with Example 10, 2 g. of 7-(N-ethyl-N-β-hydroxyethylaminoethyl)-8-benzyltheophylline hydrochloride are obtained, which melts at 185 to 186° C.

EXAMPLE 15

*Preparation of 7-(N-bis-β-hydroxyethylaminoethyl)-8-benzyltheophylline hydrochloride (Formula XIV)*

A mixture of 3.35 g. of 7-(β-chloroethyl)-8-benzyltheophylline, 2.1 g. of diethanolamine and 10 cc. of xylene is kept at boiling point under reflux for 24 hours.

Following the method described in Example 10, 3 g. of 7-(bis - β - hydroxyethylaminoethyl)-8-benzyltheophylline hydrochloride are obtained, melting at 156° C.

EXAMPLE 16

*Preparation of 7-(N-β-hydroxypropylaminoethyl)-8-benzyltheophylline hydrochloride (Formula XV)*

A mixture of 3.35 g. of 7-(β-chloroethyl)-8-benzyltheophylline, 2 g. of isopropanolamine and 10 cc. of xylene is kept boiling under reflux for 24 hours while stirring.

Using the procedure set forth in Example 10, 3 g. of 7 - (β-hydroxypropylaminoethyl)-8-benzyltheophylline hydrochloride are obtained melting at 234 to 234.5° C.

EXAMPLE 17

*Preparation of 7 - (N-α-dimethyl-β-hydroxyethylaminoethyl) - 8 - benzyltheophylline hydrochloride (Formula XVI)*

A mixture of 3.35 g. of 7-(β-chloroethyl)-8-benzyltheophylline, 2.25 g. of 2-methyl-2-amino-1-propanol and 10 cc. of xylene is kept boiling under reflux for 24 hours while stirring.

The procedure then followed is in accordance with Example 10 and 2.15 g. of 7-(α-dimethyl-β-hydroxyethylaminoethyl)-8-benzyltheophylline hydrochloride are obtained, melting at 224 to 225° C.

EXAMPLE 18

Preparation of 7 - (N - methyl - N - α - methyl-β-hydroxy-ethylaminoethyl) - 8 - benzyltheophylline hydrochloride (Formula XVII)

5 g. of 7-(β-chloroethyl-8-benzyltheophylline, 5 g. of ephedrine and 30 cc. of xylene is kept boiling under reflux for 5 hours while stirring.

The procedure is then in accordance with Example 10, and 7 - (N - methyl-N-α-methyl-β-phenyl-β-hydroxyethylaminoethyl)-8-benzyltheophylline hydrochloride is obtained, melting at 226 to 228° C. with decomposition.

EXAMPLE 19

Preparation of 7 -( N-ethyl-N-β'-hydroxyethyl-γ-aminopropyl)-8-benzyltheophylline hydrochloride (Formula XVII)

A mixture of 3.4 g. of 7-(γ-chloropropyl)-8-benzyltheophylline, 1.1 g. of N-ethylethanolamine, 2.5 g. of anhydrous potassium carbonate and 25 cc. of dry xylene is refluxed during 24 hours. The procedure is then in accordance with Example 11. The desired product is obtained with a good yield and melts at 165–168° C. after recrystallization in methyl ethyl ketone.

EXAMPLE 20

Preparation of 7 - (N-ethyl-N-β'-hydroxyethyl-δ-aminobutyl)-8-benzyltheophylline hydrochloride (Formula XIX)

A mixture of 3.6 g. of 7-(δ-chlorobutyl)-8-benzyltheophylline, 1.1 cc. of N-ethylethanolamine, 1.75 g. of anhydrous potassium carbonate and 25 cc. of dry xylene is refluxed during 24 hours with stirring.

The procedure is then in accordance with Example 10. The desired product is obtained with a good yield and melts at 143–145° C. after recrystallization in methyl ethyl ketone.

EXAMPLE 21

Preparation of 7-(N-ethyl-N-β'-hydroxyethyl-β-methyl-γ - amino - propyl)-8-benzyltheophylline hydrochloride (Formula XX)

A mixture of 3 g. of 7-(β-methyl-γ-chloropropyl)-8-benzyltheophylline, 1.75 cc. of ethylethanolamine, 2 g. of anhydrous potassium carbonate and 25 cc. of xylene is refluxed during 24 hours.

The procedure is then in accordance with Example 10. The desired product is obtained with a good yield and melts at 185–187° C. after recrystallization in methyl ethyl ketone.

EXAMPLE 22

Preparation of dragées containing 7-(N-ethyl-N-β-hydroxyethylamino-ethyl) - 8 - benzyltheophylline hydrochloride According to the usual methods, a tablet base having the following composition (per tablet) is prepared:

| | Mg. |
|---|---|
| 7 - (N - ethyl - N - β - hydroxyethylamino - ethyl)-8-benzyltheophylline hydrochloride (57.65%) | 300 |
| Saccharose (7.68%) | 40 |
| Rice starch (19.22%) | 100 |
| Potato starch (13.45%) | 70 |
| Talc (1.37%) | 7.15 |
| Magnesium stearate (0.6%) | 3.15 |
| Tartrazine (0.08%) | 0.05 |

The tablets prepared in a usual tabletting machine are provided with four coatings. The first coating comprises a mixture of shellac, sandarac and castor oil. The second coating is constituted by a sugar syrup containing methyl p-hydroxybenzoate as a preservative. The third coating comprises a sugar syrup containing talc and corn starch. Finally a sweetening layer constituted by a sugar syrup containing titanium oxide is applied, so as to obtain dragées containing each 300 mg. of active ingredient.

What is claimed is:

1. 7 - (N-ethyl-N-β-hydroxyethylaminoethyl)-8-benzyltheophylline.
2. 7 - (N-ethyl-N-β-hydroxyethylaminoethyl)-8-benzyltheophylline hydrochloride.

References Cited by the Examiner
UNITED STATES PATENTS

| | | | |
|---|---|---|---|
| 2,887,486 | 5/1959 | Leake et al. | 260—256 |
| 2,924,598 | 2/1960 | Bestian | 260—253 |
| 3,155,664 | 11/1964 | Schlesinger et al. | 260—256 |

FOREIGN PATENTS

| | | |
|---|---|---|
| 859,445 | 1/1961 | Great Britain. |

ALEX MAZEL, Primary Examiner.

MARY U. O'BRIEN, JAMES W. ADAMS, Jr., Assistant Examiners.